(12) United States Patent
Tsai

(10) Patent No.: US 7,490,865 B1
(45) Date of Patent: Feb. 17, 2009

(54) QUICK CONNECTOR

(76) Inventor: Tzu Liang Tsai, No. 16, Ya Kuo 1st. St., Chien Chen Area, Kaohsiung City (TW)

( * ) Notice: Subject to any disclaimer, the term of this patent is extended or adjusted under 35 U.S.C. 154(b) by 41 days.

(21) Appl. No.: 11/830,699

(22) Filed: Jul. 30, 2007

(51) Int. Cl.
F16L 21/06 (2006.01)

(52) U.S. Cl. .......................................... 285/322; 285/39

(58) Field of Classification Search ................... 285/39, 285/322, 323, 324
See application file for complete search history.

(56) References Cited

U.S. PATENT DOCUMENTS

| | | | | |
|---|---|---|---|---|
| 3,083,041 | A * | 3/1963 | Owenmark | 285/7 |
| 5,230,539 | A | 7/1993 | Olson | 285/323 |
| 5,722,696 | A * | 3/1998 | Taneya | 285/39 |
| 5,758,905 | A * | 6/1998 | Hama et al. | 285/38 |
| 6,199,920 | B1 * | 3/2001 | Neustadtl | 285/322 |
| 6,302,451 | B1 * | 10/2001 | Olson | 285/330 |
| 6,447,019 | B1 * | 9/2002 | Hosono et al. | 285/148.19 |
| 6,851,726 | B2 * | 2/2005 | Minemyer | 285/322 |
| 6,851,728 | B2 * | 2/2005 | Minami | 285/339 |
| 7,093,862 | B2 * | 8/2006 | Muto | 285/322 |
| 7,341,286 | B2 * | 3/2008 | Andre | 285/319 |
| 2003/0178846 | A1 * | 9/2003 | Ezura | 285/322 |
| 2004/0108712 | A1 * | 6/2004 | Liang | 285/39 |
| 2005/0110275 | A1 * | 5/2005 | Hama | 285/322 |
| 2005/0121910 | A1 * | 6/2005 | Muto | 285/322 |
| 2006/0226651 | A1 * | 10/2006 | Griswold et al. | 285/322 |
| 2008/0157520 | A1 * | 7/2008 | Ryhman | 285/322 |

* cited by examiner

Primary Examiner—James M Hewitt
(74) Attorney, Agent, or Firm—J.C. Patents

(57) ABSTRACT

A quick connector includes a body, a restricting ring and a constrictor. The body has a central through hole for liquid to flow through, a constrictor groove in the central through hole for an O-shaped ring and the constrictor to fit therein, and plural petals on an upper end. The restricting ring has a center hole, an inner circumference and an outer circumference, with an annular wall defined between the inner and the outer circumference. Plural holes are formed in the annular wall, so the petals of the body fit in the holes of the restricting ring to combine with the body. The inner surface of the inner circumference is sloped to restrict the movement of the constrictor. The constrictor has plural elastic petals, which have an inner clamp surface for closely clamping the surface of a plastic tube, and a pointed end for catching or loosening the plastic tube.

2 Claims, 6 Drawing Sheets

QUICK CONNECTOR

BACKGROUND OF THE INVENTION

1. Field of the Invention

This invention relates to a quick connector, particularly to one easy to operate for separating a plastic tube processed, with the outer surface of the plastic tube not scarred or hurt.

2. Description of the Prior Art

A first conventional quick connector shown in FIG. 1, for connecting plastic tubes used for RO percolating devices, includes a body 1, and a constricting set 2.

The body 1 has a central through hole 10 for receiving a plastic tube that is used for liquid to flow through.

The constricting set 2 is deposited in the central through hole 10 of the body 1, provided with a constrictor 20 having a center hole for a plastic tube to pass through, an inlet 200 of a large diameter and an exit 202 of a small diameter. The inlet 200 has a plurality of petals 202 spaced apart equidistantly on its annular wall, and the exit 201 also has a plurality of petals spaced apart equidistantly on its annular wall. The dimensions of the petals 202 is larger than that of the petals 203 that are a little sloped inward so as to constrict the surface of a plastic tube to be connected. Further, a press button 22 is provided for pushing open the petals 202 of the inlet 200 for connecting or disconnecting a tube. Further, a bushing 21 is provided to fit in the central through hole 10 and then welded together with the body by means of high frequency processing for preventing the constrictor from loosing out. The bushing 21 is provided with a central cone-shaped hole 210 for the press button 22 to sit therein. The press button 22 has a conical circumference 220 in the lower portion, and a cylindrical circumference 221 on the conical circumference 220 with a connecting edge 222 formed between the cylindrical and the conical circumference 220 and 221. Therefore, when the compress button 22 is forced to fit in the hole 210, the connecting edge 222 is stopped by a front circumference of the bushing 21 to let the compress button 22 stabilized in place. Further, the compress button 22 has a large flange 223 at the upper end to locate at an outer side of the body 1 so as to easily press the compress button 22, and a central through hole 224 for a plastic tube to fit in.

However, this first conventional connector has the constrictor 2 made of metal, resulting in high cost, and their components are rather complicated, having a large dimensions not profitable, in addition to a flaw of potentially hurting the surface of a plastic tube connected. Further, replacing a tube is not convenient, often forced to press tightly the compress button, very inconvenient in operation.

A second conventional quick connector shown in FIGS. 2, 3 and 4 includes a body 3A and a constrictor 3. The body 3 has a tapered central hole 3A0, and a constrictor hole 3A1 formed in an upper portion of the body 3A on the tapered central hole 3A0 with an annular straight vertical wall for an O-shaped ring 3A2 and then the constrictor 3 to fit therein. The constrictor 3 is made integral, having a large circumference 30 and plural petals 31 formed at the circumference 30 in order to constrict a plastic tube 11. Further, the constrictor 3 is provided with an engage member 32 made of metal.

However, the second conventional connector has the following disadvantages.

1. The metal engage member 32 has to be placed in a mold before the constrictor 3 is formed by means of injecting molding process, taking much time and costing much.
2. The metal engage member 32 has to be combined perfectly, or resulting in unqualified products.
3. The metal engage member 32 clamps a plastic tube as shown in FIG. 2, and although four petals 31 push against the surface of the plastic tube 11, actually only four points contact the tube surface, so the tube is easily pulled out by a little force, and if worse, the constrictor 3 may be pulled out together with the tube.
4. The metal engage member easily sticks into a plastic tube, so the tube becomes difficult to be pulled out as shown in FIG. 4, resulting in impossible reuse of the plastic tube, in addition to leaking of liquid.
5. If the constrictor catches a plastic tube for long, without any pulling off, the engage member 32 has bit in the plastic tube, letting the tube impossible to be pulled out.
6. After the engage member clamps tightly a plastic tube, even if the constrictor is pushed inward, forcing the O-shaped ring 3A2 to disfigure, the plastic tube cannot quickly be pulled out.
7. As shown in FIG. 4, in operation, one hand has to press the constrictor, and the other hand has to pull the plastic tube, needing much force, not easily pulling out the tube.

Next, a quick connector disclosed in a US patent of U.S. Pat. No. 5,230,539 includes a body 11, a sleeve 30 at one side of the body 11, as shown in FIGS. 1-6. If the body 11 is combined with the sleeve 30 by means of high frequency or supersonic process, it is the same structure as the first conventional quick connector mentioned above. As shown in FIG. 3, a collect 40 is provided with an intermediate boss portion 42 and a frusto-conical outer surface 45, which pushes an O-shaped ring 50. The frusto-conical surface is provided with teeth 46 in an inner surface, and the teeth 46 clamp the surface of a plastic tube 60. The flaw of this connector is that the plastic tube 60 can only be stabilized by the frusto-conical outer surface 45, by the teeth 46 clamping the surface of the plastic tube 60. So replacing a plastic tube is very troublesome.

SUMMARY OF THE INVENTION

The invention has been devised to offer a quick connector easily assembled and simple in operation.

The quick connector in the invention is composed of a body, a restricting ring and a constrictor, having the following advantages.

1. The body has a central through hole for liquid to flow through, a constrictor groove formed in the through hole for receiving an O-shaped ring and the constrictor, and plural petals extending upward from an upper end.
2. The restricting ring has a center hole, an inner circumference defined by the center hole and an outer circumference, and an annular wall defined by the inner and the outer circumference. Further, plural holes are formed in the annular wall, spaced apart equidistantly. Then the petals of the body fit in the holes of the restricting ring to combine the body with the restricting ring.
3. The constrictor has plural elastic petals in a lower portion to fit in the center hole of the restricting ring for clamping a plastic tube tightly, and the movement of the constrictor is restricted by the inner surface of the center hole of the restricting ring, clamping a plastic tube more tightly in case of pulled outward gradually.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
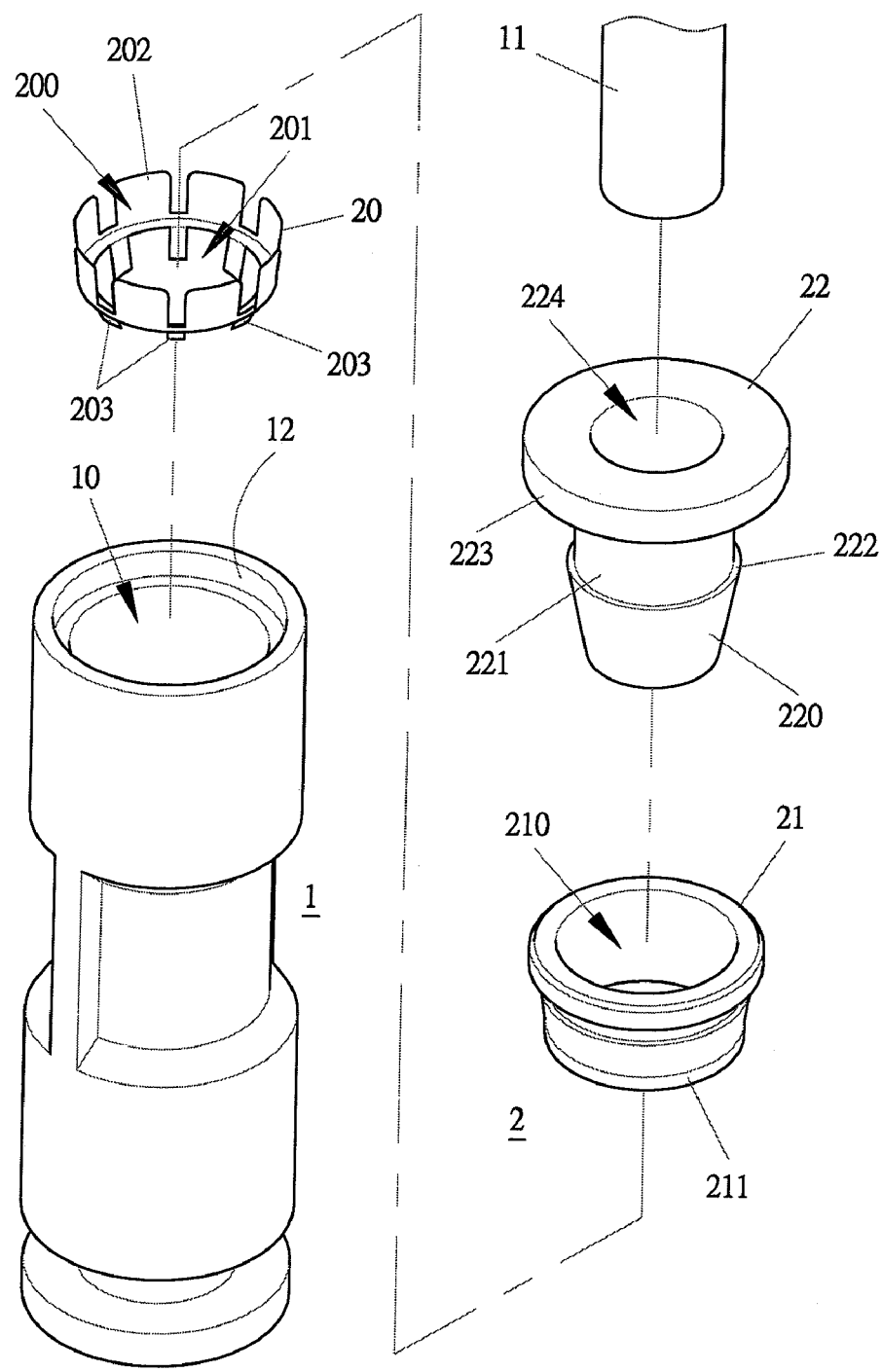
FIG. 1 is an exploded perspective view of a first conventional quick connector.
Figure 2:
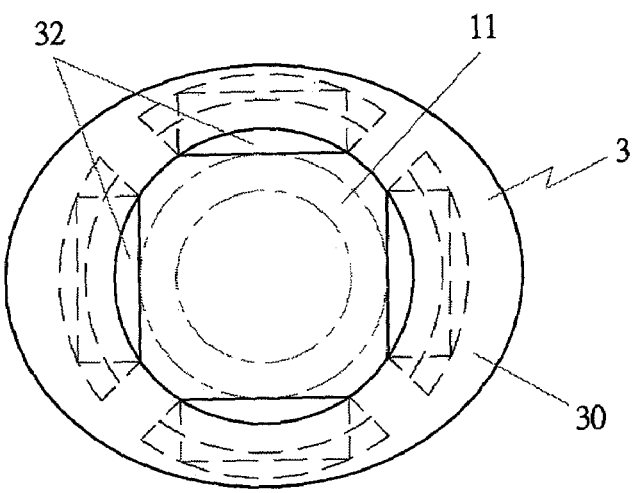
FIG. 2 is a front view of a second conventional quick connector.
Figure 3:
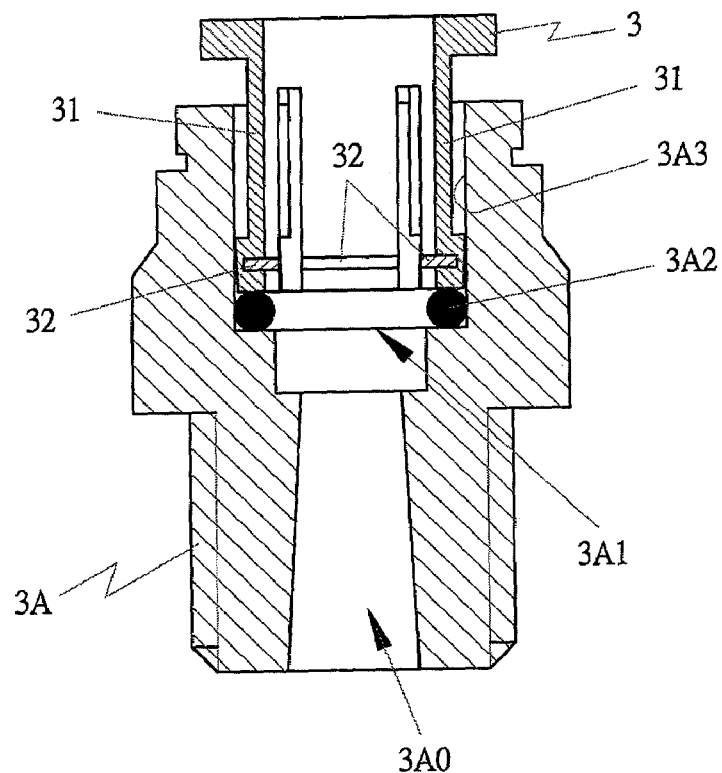
FIG. 3 is a cross-sectional view of the second conventional quick connector.
Figure 4:
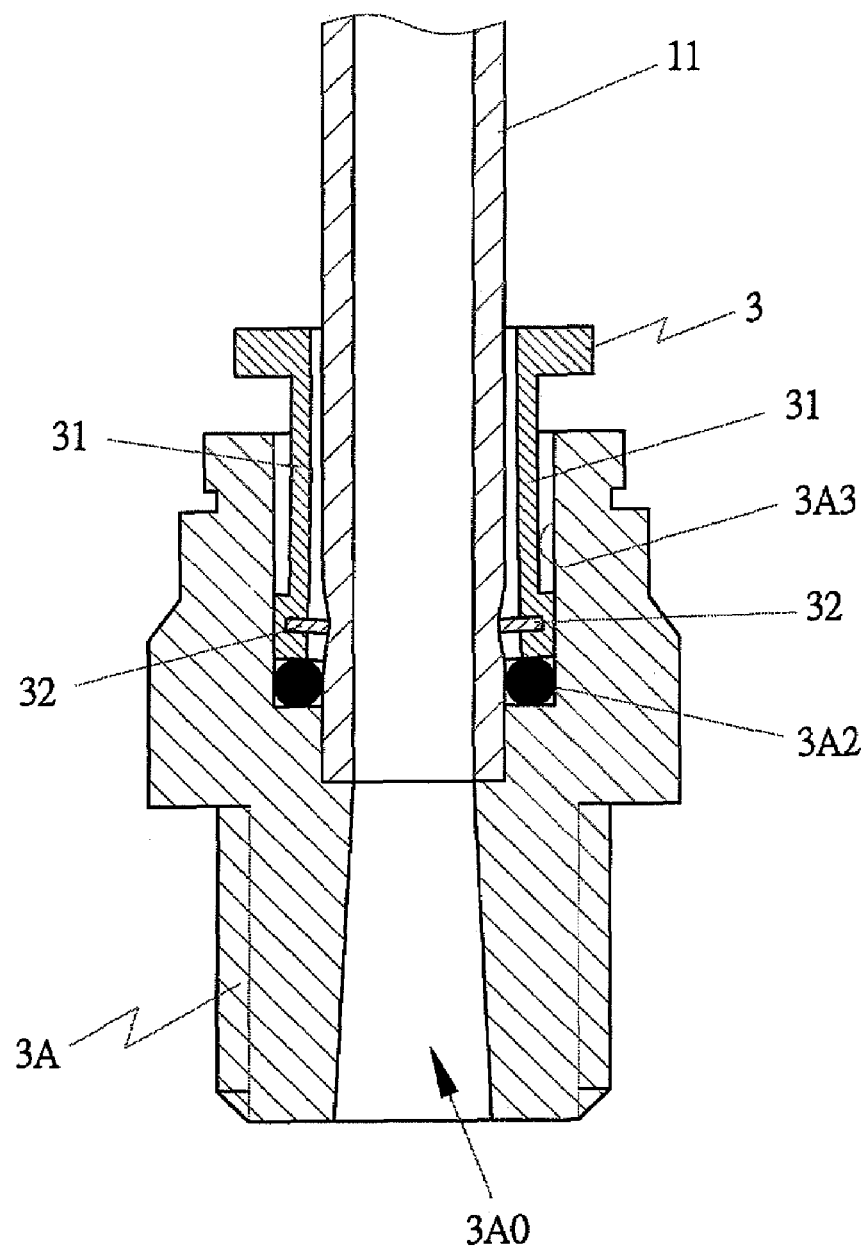
FIG. 4 is a cross-sectional view of the second conventional quick connector connected with a plastic tube.
Figure 5:
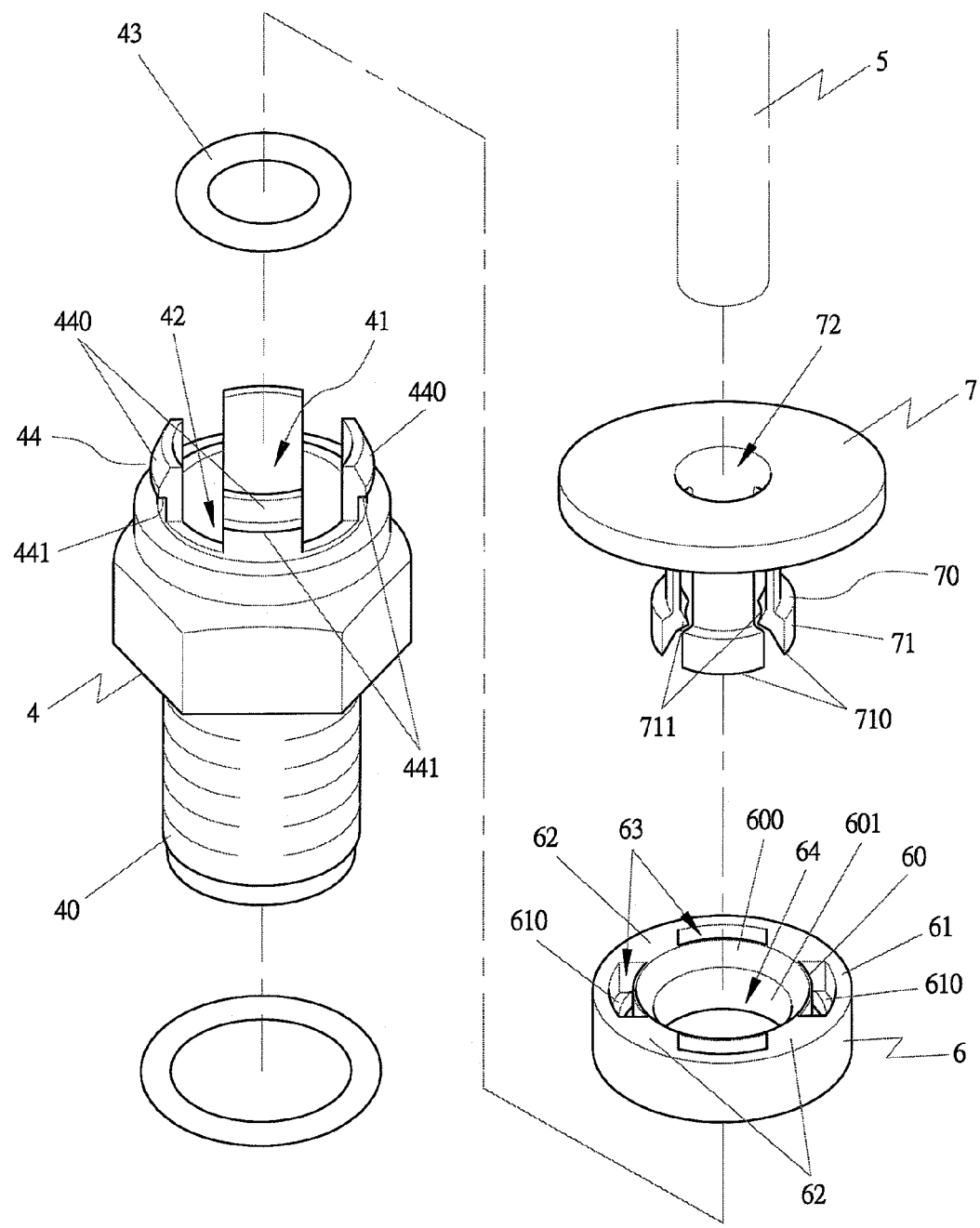
FIG. 5 is an exploded perspective view of a quick connector in the present invention.
Figure 6:
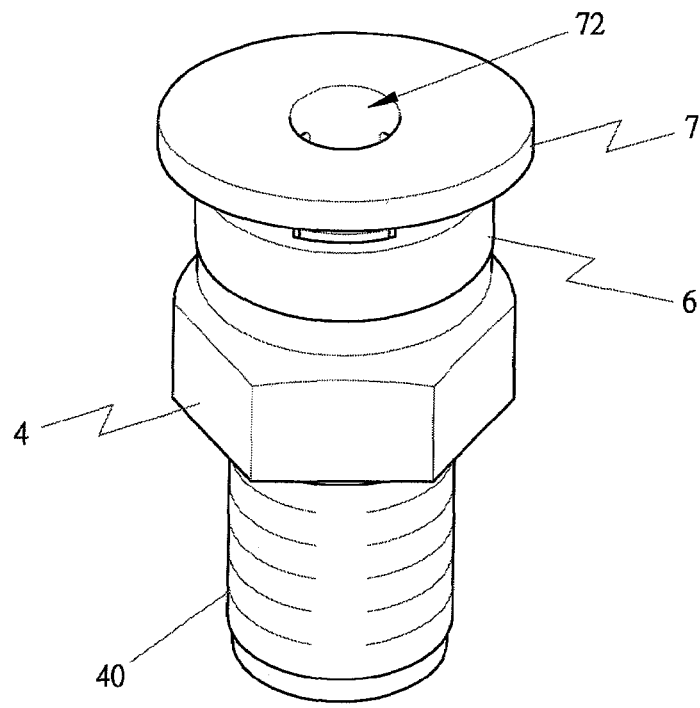
FIG. 6 is a perspective view of the quick connector in the present invention.

A preferred embodiment of a quick connector in the present invention, as shown in FIGS. 5 and 6, includes a body 4, a restricting ring 6 and a constrictor 7 as main components.

The body 4 is provided with male threads 40 in a lower portion, a central through hole 41 for liquid to flow through, a constrictor groove 42 formed in the through hole 41, an O-shaped ring 43 fitted in an innermost location in the constrictor groove 42 for preventing leakage and loosening a plastic tube as well, plural clamping petals 44 extending up from an upper end and spaced apart equidistantly. The clamping petals 44 respectively have an outer sloped surface 440 and an inner clamping surface 441.

Figure 7:
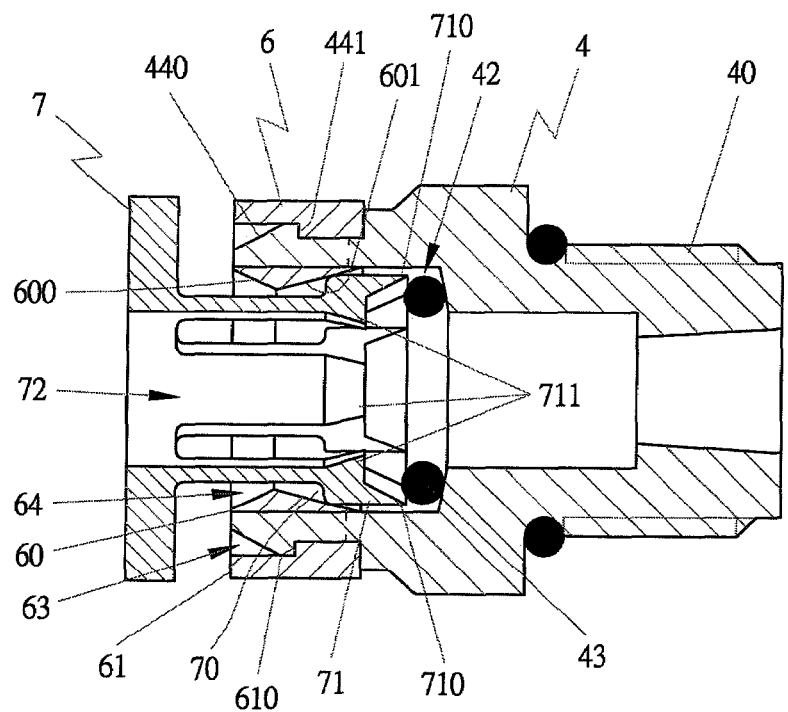
FIG. 7 is a cross-sectional view of the quick connector in the present invention.

The restricting ring 6 has an inner circumference 60 defined by a center hole 64 and an outer circumference 61, an annular wall 62 defined between the inner circumference 60 and the outer annular surface 61, plural holes 63 formed spaced apart equidistantly in the annular wall 62 as shown in FIG. 7. Then the clamping petals 44 can pass upward through the plural holes 63, with the inner surface 441 contacting tightly with an inner contacting surface 610 of the restricting ring 6. Thus the body 4 and the restricting ring 6 are combined together in a very convenient way, compared with the conventional quick connectors mentioned above. Moreover, the O-shaped ring 43 is constrained in the constrictor groove 42 at the same time, and the restricting ring 6 has a center hole with a front sloped surface 600 and a rear sloped surface 601.

The constrictor 7 is provided with plural elastic petals 70 formed spaced apart equidistantly in a lower portion in an annular shape, and the petals 70 can move outward and inward, respectively having a front outer surface 71 with a pointed end 710 and an inner clamping member 711. Then the constrictor 70 is inserted in the constrictor groove 42 after passing through the center hole 64 of the restricting ring 6, with the petals 70 easily moving through the center hole 64 owing to the front sloped surface 600 and then prevented by the rear sloped surface 601 from moving outward. The constrictor 7 is further provided with a center hole 72 for a plastic tube to fit through, as shown in FIGS. 8 and 9.

Figure 8:
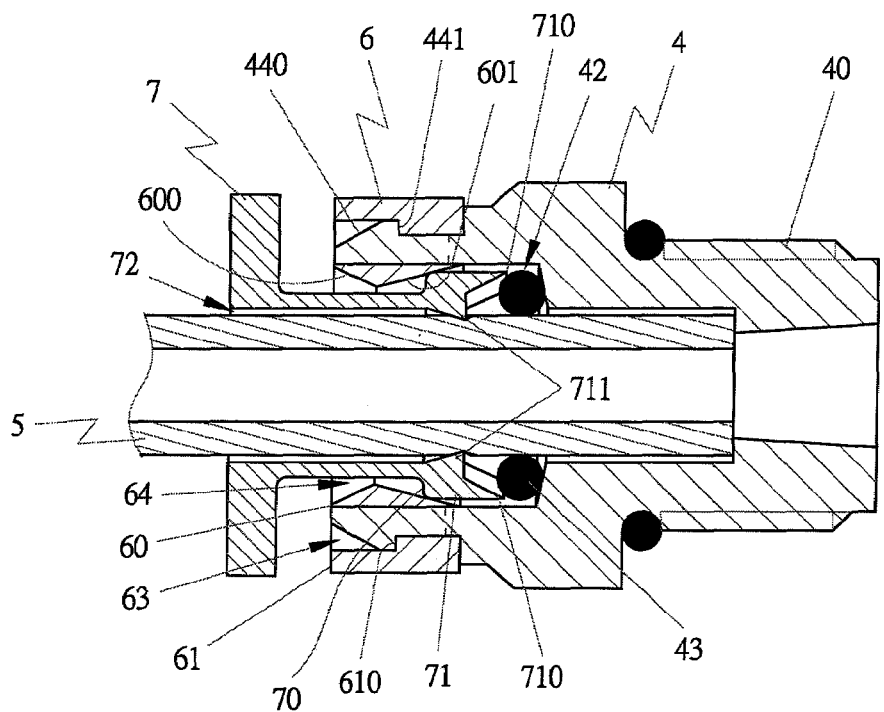
FIG. 8 is a cross-sectional view of the quick connector connected with a plastic tube in the present invention; and, FIG. 9 is a cross-sectional view of the quick connector connected with a plastic tube to be pulled out in the present invention.

Next, when one end of a plastic tube 5 is inserted in the center hole 72 of the constrictor 7 to reach a certain point, as shown in FIG. 8, that end of the plastic tube 5 practically pushes a proper location of the central through hole 41 of the body 4, with the pointed end of the petals 70 being in contact with the O-shaped ring 43. At this time, the rear sloped surface 601 of the inner circumference 60 of the restricting ring 6 forcefully presses the front outer surface 71 of the petals 70, letting the inner clamping member 711 of the front outer surface tightly clamp the surface of the plastic tube 5. Moreover, the inner clamping surface 711 has the same curve as the surface of a plastic tube so as to closely contact with the surface of the plastic tube so that the plastic tube can hardly be pulled out. As the inner clamping surface 711 does not hurt the surface of a plastic tube 5, which is then possible to be used repeatedly. Once a plastic tube 5 is connected, the front outer surface 71 presses the rear sloped surface 601 of the inner circumference 60 of the restricting ring 6, letting the front outer surface 71 more tightly clamp the plastic tube 5, which is then not easily pulled out.

Figure 9:
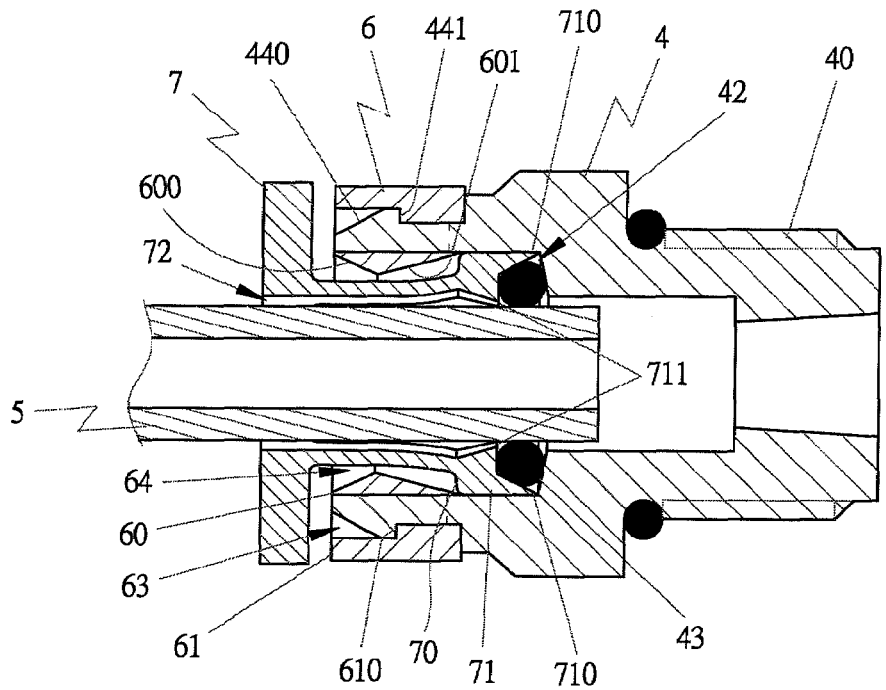

In case the plastic tube 5 is wanted to be replaced with a new one, a person grips the plastic tube 4 with one hand, and then pushes the constrictor 7 inward, forcing the pointed end 710 to move outward along O-shaped ring 43, as shown in FIG. 9. Then the front clamping surface 711 frees the plastic tube 5. Thus the quick connector in the invention is very simple to operate.

While the preferred embodiment of the invention has been described above, it will be recognized and understood that various modifications may be made therein and the appended claims are intended to cover all such modifications that may fall within the spirit and scope of the invention.

What is claimed is:

1. A quick connector comprising:
 a body provided with male threads and a central through hole, a constrictor groove formed in said central through hole, an O-shaped ring fitted in said constrictor groove, plural clamping petals formed to extend upward spaced apart equidistantly from an upper annular end, each said clamping petal provided with an outer sloped surface and an inner surface;
 a restricting ring having a center hole defining an inner circumference, an annular wall defined between said inner circumference and an outer circumference, plural holes formed spaced apart equidistantly in said annular wall for said clamping petals of said body to pass through upward respectively, said inner surface of said body urging an inner surface of said outer circumference of said restricting ring so that said body may be stably combined with said restricting ring, said annular surface of said center hole provided with a front sloped surface and a rear sloped surface;
 a constrictor provided with plural petals spaced apart equidistantly in a lower portion, each said petal having an outer surface with a pointed end and a clamping surface formed in an inner side, wherein said constrictor is positioned in said constrictor groove of said body after passing through said center hole of said restricting ring.

2. The quick connector as claimed in claim 1, wherein said petals of said constrictor pass through said center hole owing to said front sloped surface of said inner circumference of said restricting ring.

* * * * *